(12) United States Patent
Tomonelli

(10) Patent No.: US 6,966,839 B2
(45) Date of Patent: Nov. 22, 2005

(54) PROPSHAFT ASSEMBLY WITH DAMPER

(75) Inventor: Ralph Tomonelli, Royal Oak, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 268 days.

(21) Appl. No.: 10/631,312

(22) Filed: Jul. 31, 2003

(65) Prior Publication Data

US 2005/0026707 A1   Feb. 3, 2005

(51) Int. Cl.$^7$ .................................................. F16C 3/00
(52) U.S. Cl. ..................... 464/180; 464/78; 188/378
(58) Field of Search .................. 464/78, 180, 183; 138/119; 285/49, 370, 397; 403/309, 313; 188/378, 379

(56) References Cited

U.S. PATENT DOCUMENTS

| | | | |
|---|---|---|---|
| 987,296 A * | 3/1911 | Hahn | |
| 1,377,101 A * | 5/1921 | Sparling | ..................... 403/313 |
| 1,448,953 A * | 3/1923 | Crescio | |
| 1,714,590 A * | 5/1929 | Dake | |
| 1,769,967 A * | 7/1930 | Saurman et al. | ........ 403/309 X |
| 2,751,765 A | 6/1956 | Rowland et al. | |
| 2,998,269 A * | 8/1961 | Houghton | |
| 3,075,406 A | 1/1963 | Butler, Jr. et al. | |
| 3,155,095 A * | 11/1964 | Brown | ................... 285/397 X |
| 4,014,184 A | 3/1977 | Stark | |
| 4,323,727 A * | 4/1982 | Berg | |
| 4,626,002 A * | 12/1986 | Hagemeister et al. | ... 285/370 X |
| 4,712,811 A * | 12/1987 | Wier | |
| 4,747,799 A | 5/1988 | Kato | |
| 4,909,361 A | 3/1990 | Stark et al. | |
| 5,868,627 A | 2/1999 | Stark et al. | |
| 5,902,186 A | 5/1999 | Gaukel | |
| 5,904,622 A | 5/1999 | Breese et al. | |
| 5,976,021 A | 11/1999 | Stark et al. | |
| 6,010,407 A | 1/2000 | Ishikawa | |
| 6,215,205 B1 | 4/2001 | Banas et al. | |
| 6,370,756 B1 | 4/2002 | Conger et al. | |
| 6,409,606 B1 * | 6/2002 | Nakajima et al. | ....... 464/183 X |
| 6,428,017 B1 | 8/2002 | Galonska et al. | |
| 6,736,246 B2 * | 5/2004 | Haneishi et al. | ........ 464/180 X |

* cited by examiner

*Primary Examiner*—Greg Binda
(74) *Attorney, Agent, or Firm*—Harness, Dickey & Pierce P.L.C.

(57) ABSTRACT

A propshaft assembly with a shaft structure and an insert member. The insert member has a front end having a first slot and a rear end having a second slot. The first slot is configured to at least partially overlap the second slot providing a staggered slot configuration, which ensures a proper fit when installed into the shaft structure.

12 Claims, 4 Drawing Sheets

PROPSHAFT ASSEMBLY WITH DAMPER

FIELD OF THE INVENTION

The present invention generally relates to vibration attenuation in vehicle drivelines and more particularly to an improved configuration for a vibration-attenuating propshaft insert and a method for its construction.

BACKGROUND OF THE INVENTION

Propshafts are commonly employed for transmitting power from a rotational power source, such as the output shaft of a vehicle transmission, to a rotatably driven mechanism, such as a differential assembly. As is well known in the art, propshafts tend to transmit vibration while transferring rotary power. When the propshaft is excited at a harmonic frequency, vibration and noise may be amplified, creating noise and transmitting vibration that is undesirable to passengers riding in the vehicle. Thus, it is desirable and advantageous to attenuate vibrations within the propshaft in order to reduce noise within the vehicle passenger compartment.

Various devices have been employed to attenuate the propagation of noise from propshafts including inserts that are made from cardboard, foam, or resilient materials, such as rubber. The inserts that are typically used for a given propshaft are generally identical in their configuration (i.e., construction, size, mass and density) and are installed in the propshaft prior to the propshaft being installed in the vehicle. Integration of the propshaft assembly in this manner is advantageous in that it greatly simplifies the installation of the propshaft. Despite the various advantages, several drawbacks remain.

One such drawback is the susceptibility of current propshaft assemblies to the environment in which they are installed. More specifically, changing temperature and humidity levels cause a propshaft insert to swell or shrink. A loose propshaft insert poses myriad problems during installation. It is therefore, desirable to provide an improved propshaft insert that is able to withstand the changes in the environment in which it is installed.

Another such drawback is the necessary deformation of the propshaft insert when it is inserted into a propshaft. More specifically, the typical insert may need to be deformed to be inserted into the propshaft. The deformation of the propshaft insert may cause a reduction in its diameter. After installation, the insert may not return to its predetermined diameter, which that otherwise ensures a tight fit within the propshaft. It is desirable, therefore, to provide the propshaft insert with an improved configuration to ensure proper installation.

SUMMARY OF THE INVENTION

A propshaft assembly that includes a shaft structure with a hollow cavity and an insert member disposed within the hollow cavity and engages the shaft structure. The insert member includes a first slot extending axially a first distance from a front end and a second slot extending axially a second distance from a rear end. The first slot is spaced apart radially from said second slot.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
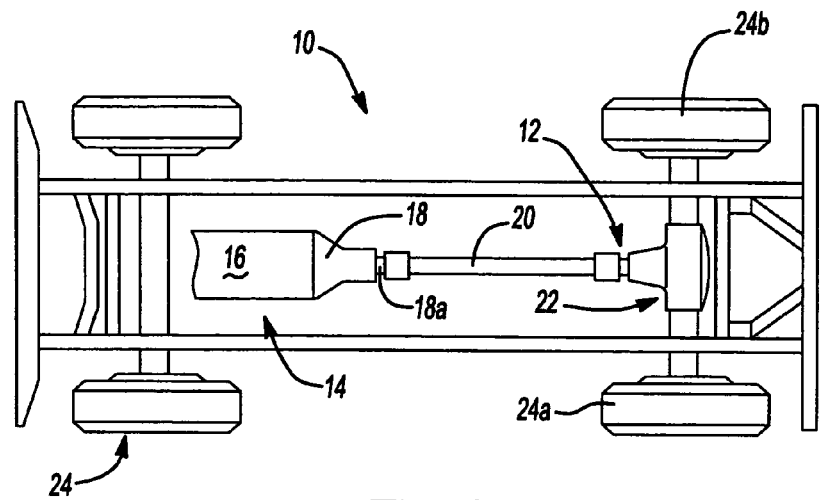
FIG. 1 is a schematic illustration of an exemplary vehicle constructed in accordance with the teachings of the present invention.

With reference to FIG. 1 of the drawings, a vehicle having a propshaft assembly that is constructed in accordance with the teachings of the present invention is generally indicated by reference numeral 10. The vehicle 10 includes a driveline 12, which is drivable via a connection to a power train 14. The power train 14 includes an engine 16 and a transmission 18. The driveline 12 includes a propshaft assembly 20, a rear axle 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output 18a and a gear reduction unit. The gear reduction unit is operable for coupling the transmission input to the transmission output at a predetermined gear speed ratio. The propshaft assembly 20 is coupled for rotation with the output 18a of the transmission 18. Drive torque is transmitted through the propshaft assembly 20 to the rear axle 22 where it is selectively apportioned in a predetermined manner to the left and right rear wheels 24a and 24b, respectively.

Figure 2:
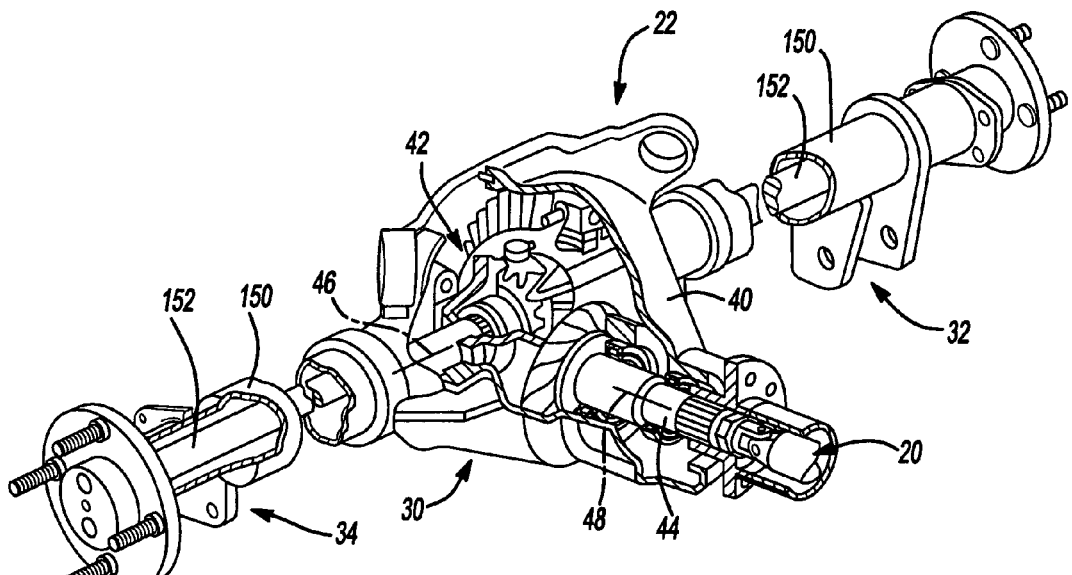
FIG. 2 is a top partially cut-away view of a portion of the vehicle of FIG. 1 illustrating the rear axle and the propshaft in greater detail.
Figure 3:
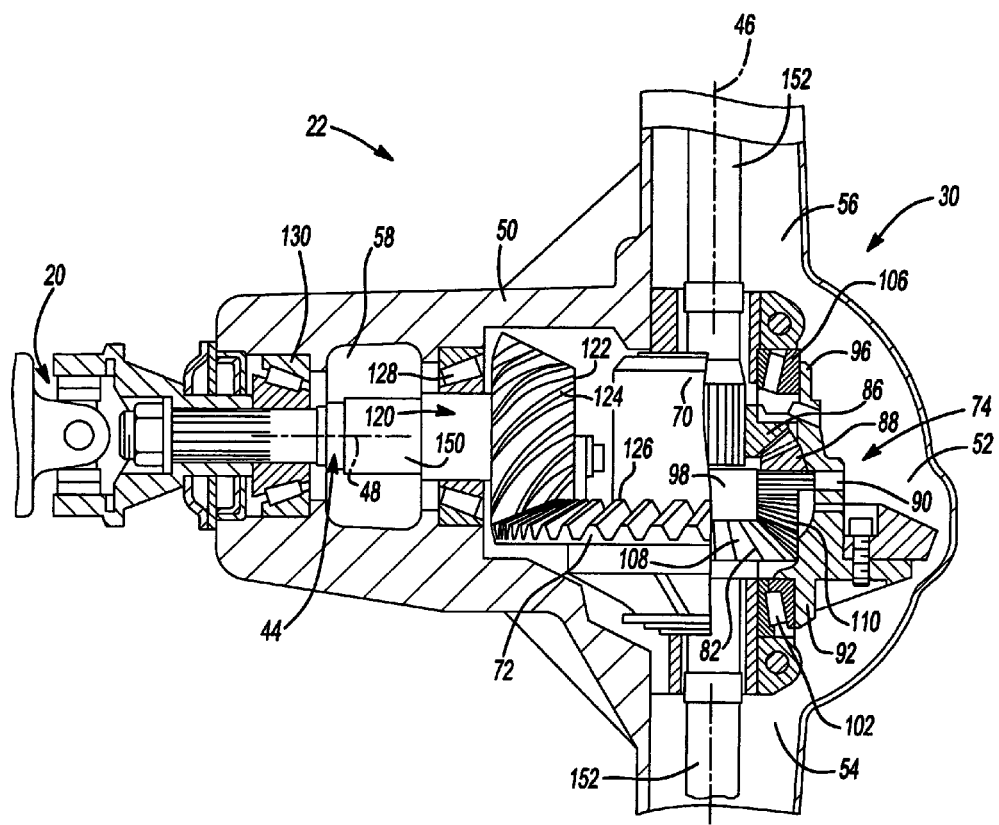
FIG. 3 is a sectional view of a portion of the rear axle and the propshaft.

With additional reference to FIGS. 2 and 3, the rear axle 22 is shown to include a differential assembly 30, a left axle shaft assembly 32, and a right axle shaft assembly 34. The differential assembly 30 includes a housing 40, a differential unit 42 and an input shaft assembly 44. The housing 40 supports the differential unit 42 for rotation about a first axis 46 and further supports the input shaft assembly 44 for rotation about a second axis 48 that is perpendicular to the first axis 46.

The housing 40 is initially formed in a suitable casting or stamping process and thereafter machined as required. The housing includes a wall member 50 that defines a central cavity 52 having a left axle aperture 54, a right axle aperture 56, and an input shaft aperture 58. The differential unit 42 is disposed within the central cavity 52 of the housing 40 and includes a case 70, a ring gear 72 that is fixed for rotation with the case 70, and a gearset 74 that is disposed within the case 70. The gearset 74 includes first and second side gears 82 and 86 and a plurality of differential pinions 88, which are rotatably supported on pinion shafts 90 that are mounted to the case 70. The case 70 includes a pair of trunnions 92 and 96 and a gear cavity 98. A pair of bearing assemblies 102 and 106 are shown to support the trunnions 92 and 96, respectively, for rotation about the first axis 46. The left and right axle assemblies 32 and 34 extend through the left and right axle apertures 54 and 56, respectively, where they are coupled for rotation about the first axis 46 with the first and second side gears 82 and 86, respectively. The case 70 is operable for supporting the plurality of differential pinions 88 for rotation within the gear cavity 98 about one or more axes that are perpendicular to the first axis 46. The first and second side gears 82 and 86 each include a plurality of teeth 108 which meshingly engage teeth 110 that are formed on the differential pinions 88.

The input shaft assembly 44 extends through the input shaft aperture 58 where it is supported in the housing 40 for rotation about the second axis 48. The input shaft assembly 44 includes an input shaft 120, a pinion gear 122 having a plurality of pinion teeth 124 that meshingly engage the teeth 126 that are formed on the ring gear 72, and a pair of bearing assemblies 128 and 130 which cooperate with the housing 40 to rotatably support the input shaft 120. The input shaft assembly 44 is coupled for rotation with the propshaft assembly 20 and is operable for transmitting drive torque to the differential unit 42.

The left and right axle shaft assemblies 32 and 34 include an axle tube 150 that is fixed to the associated axle aperture 54 and 56, respectively, and an axle half-shaft 152 that is supported for rotation in the axle tube 150 about the first axis 46. Each of the axle half-shafts 152 includes an externally splined portion 154 that meshingly engages a mating internally splined portion (not specifically shown) that is formed into the first and second side gears 82 and 86, respectively.

Figure 4:
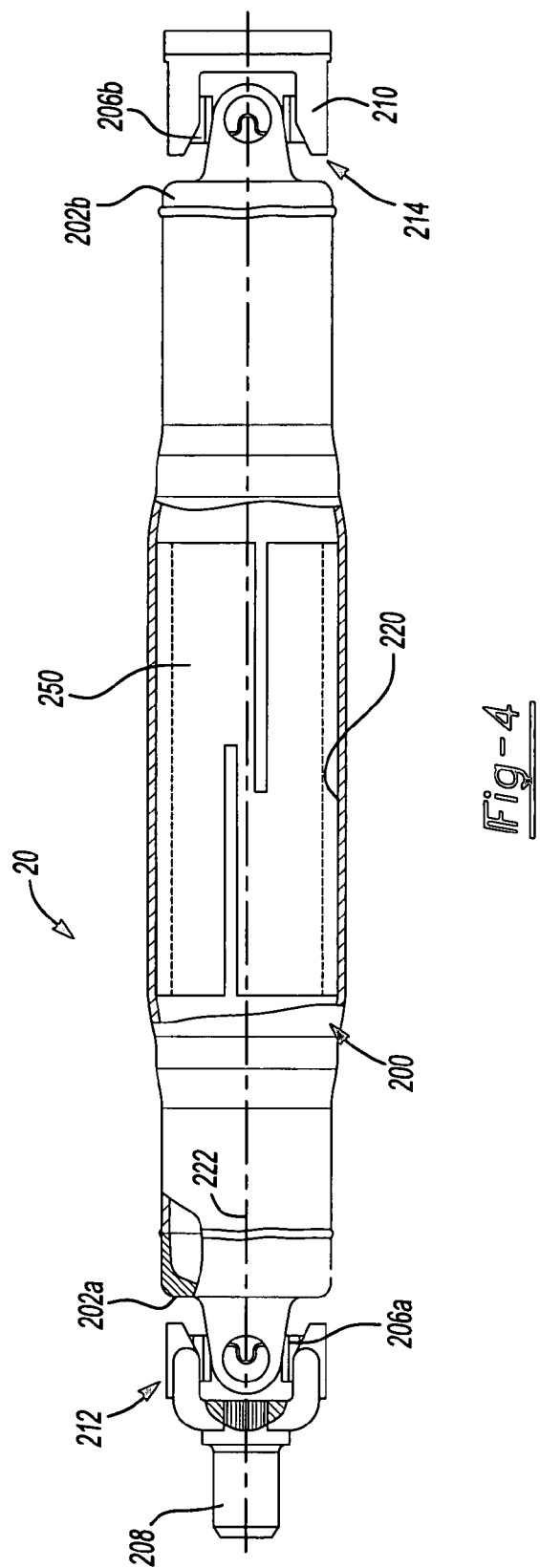
FIG. 4 is a top, partially cut away view of the propshaft showing an insert member of the present invention.

With additional reference to FIG. 4, the propshaft assembly 20 is shown to include a shaft structure 200, first and second trunnion caps 202a and 202b, first and second spiders 206a and 206b, a yoke assembly 208 and a yoke flange 210. The first and second trunnion caps 202a and 202b, the first and second spider 206a and 206b, the yoke assembly 208 and the yoke flange 210 are conventional in their construction and operation and as such, need not be discussed in detail. Briefly, the first and second trunnion caps 202a and 202b are fixedly coupled to the opposite ends of the shaft structure 200, typically via a weld. Each of the first and second spiders 206a and 206b is coupled to an associated one of the first and second trunnion caps 202a and 202b and to an associated one of the yoke assembly 208 and the yoke flange 210. The yoke assembly 208, first spider 206a, and first trunnion cap 202a collectively form a first universal joint 212, while the yoke flange 210, second spider 206b and second trunnion cap 202b collectively form a second universal joint 214.

The shaft structure 200 is illustrated to be generally cylindrical, having a hollow central cavity 220 and a longitudinal axis 222. The shaft structure 200 is preferably formed from a welded seamless material, such as aluminum (e.g., 6061-T6 conforming to ASTM B-210) or steel. The propshaft assembly 20 and other items in an exemplary vehicle drivetrain are discussed in greater detail in commonly assigned copending U.S. patent application Ser. No. 10/097,701, titled Foam Lined Propshaft, which was filed on Mar. 13, 2002, now U.S. Pat. No. 6,752,722 and is hereby incorporated by reference in its entirety as if fully set forth herein.

Figure 5:
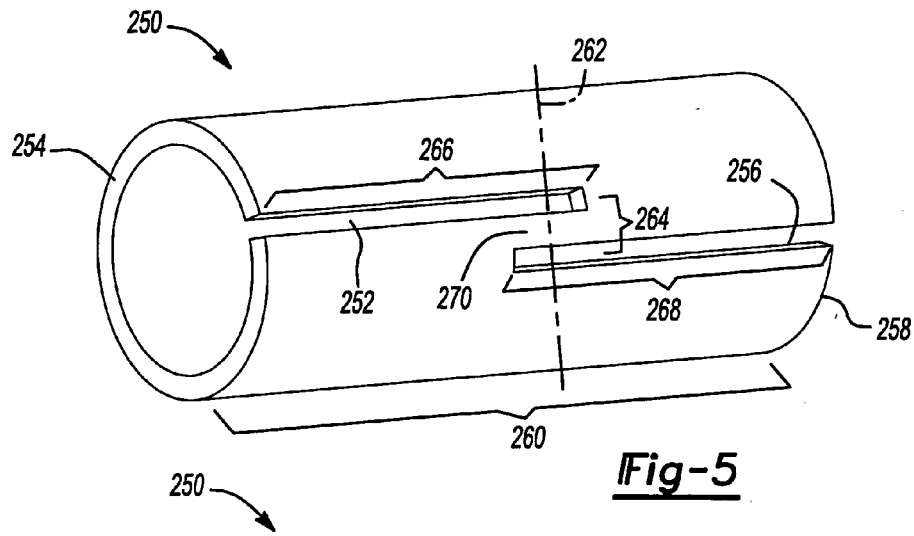
FIG. 5 is a perspective view of the insert member of FIG. 4 showing a first slot and a second slot.

With reference to FIGS. 4 and 5 one or more insert members 250 may be inserted into the shaft structure 200 to attenuate vibration that is produced during transmission of rotary power by the propshaft assembly 20. In the particular example provided, a single insert member 250 is employed. The insert member 250 is a tubular structure having a shape that is generally complementary to the inside surface of the shaft structure 200. In the embodiment illustrated, the insert member 250 is configured as a cylindrical tube with a generally circular cross-section. The insert member 250 is further configured with two or more slots.

In the example provided, a front end 254 of the insert member 250 includes a first slot 252 formed therethrough, while a rear end 258 includes a second slot 256 formed therethrough. The insert member 250 is additionally configured such that the first slot 252 and the second slot 256 are not as long as the length 260 of the insert member but longer than half the length 260 of the insert member. To that end, the first slot 252 and the second slot 256 extend beyond the axial midpoint 262 (shown in a broken line) of the insert member 250. It follows, therefore, that the first slot 252 and the second slot 256 overlap and, as such, the insert member 250 can be said to have a staggered slot configuration.

Figure 6:
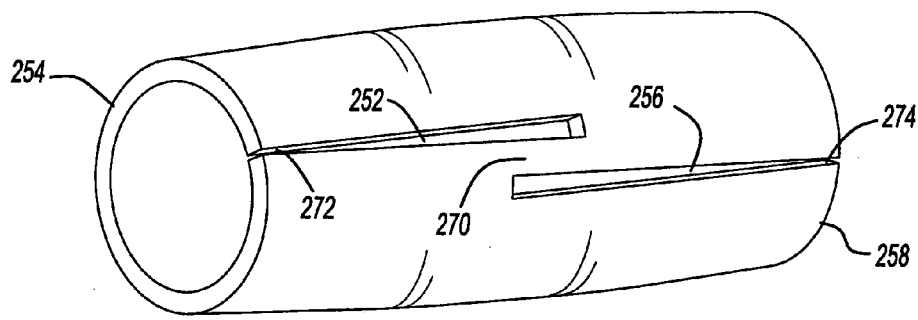
FIG. 6 is a perspective view of the insert member of FIG. 5 showing a front end and rear end in a deformed condition.

With reference to FIGS. 6 and 6, the first slot 252 and the second slot 256 are spaced apart by a gap distance 264. The gap distance 264 dimension is configured to allow the front end 254 and the rear end 258 to slightly deform when the insert member 250 is inserted into the shaft structure 200 (FIG. 4). It should be appreciated that the gap distance 264 or the gap dimension may be a radial distance such as the radial distance between two radial lines drawn from the centerline of the insert member 250. Moreover, the gap distance 264 or gap dimension may also be a distance, such as the distance between two longitudinal or axial lines drawn parallel to the centerline of the insert member 250.

As such, the front end 254 and the rear end 258 in a deformed condition are generally indicated in FIG. 6 by reference numerals 272 and 274, respectively. While the front end 254 and the rear end 258 may deform, the insert member 250 returns to generally its original shape after is has been inserted into the shaft structure 200. The ability to deform (FIG. 6) and return to the undeformed state (FIG. 5) allows for the insert member 250 to be more easily installed and, moreover, maintain its tight fit within the shaft structure 200 (FIG. 4).

Figure 7:
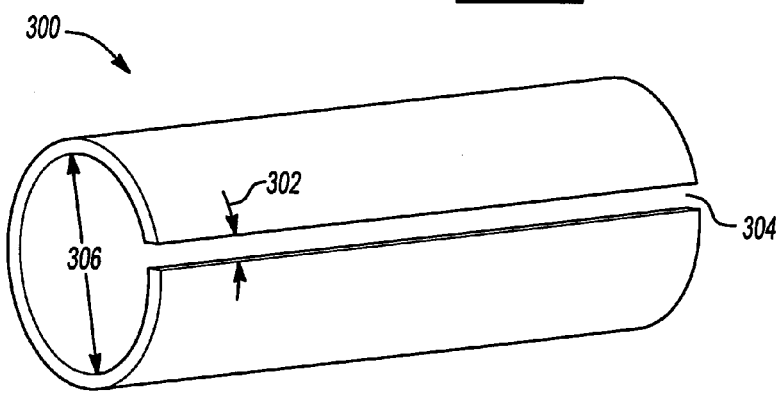
FIG. 7 is a perspective of a prior art insert member.

When compared to the prior art implementation of a c-shaped insert 300, shown in FIG. 7, the insert member 250 of FIGS. 5 and 6 is more resilient to the forces applied to it during installation into the shaft structure 200 (FIG. 4). It should be appreciated that the inserts for the propshaft assembly 20 (FIG. 4) are typical designed with an interference fit, so that deformation is required to install the insert into the propshaft assembly. The c-shaped insert 300, therefore, requires a deformation that results in a width 302 of a channel 304 being reduced in size, which results in the diameter 306 being reduced in size. The reduction of the diameter 306 thus allows the c-shaped insert 300 to be installed into a shaft structure similar to the shaft structure 200, which is illustrated in FIG. 4.

The c-shaped insert 300, however, may not return to its original size after deformation, which may result in a loose fit. Furthermore, deforming the c-shaped insert 300 may render it inoperable. The configuration of the present invention that is illustrated in FIGS. 4 and 5, therefore, permits the necessary deformation of the front end 254 and the rear end 258, as shown in FIG. 6, which allows for easier installation of the insert member 250 but also maintains the requisite dimensions to ensure a tight fit within the shaft structure 200.

With reference to FIGS. 4 and 5, the gap distance 264, a first slot length 266, and a second slot length 268 may be further configured to provide the insert member 250 with resiliency to the environment in which it is installed. More specifically, changing temperature and humidity levels may cause the insert member to swell or shrink or otherwise change dimensions. The prior art c-shaped insert 300 of FIG. 7 may shrink to the point where the fit within the shaft structure is no longer tight due to the full length channel 304. The insert member 250 of FIGS. 4 and 5, however, may also shrink or swell in response to the changes in the environment but maintains a tight fit within the shaft structure 200. More specifically, the configuration of a bridging member 270 and the gap distance 264 between the first slot 252 and the second slot 256 provides improved resiliency, which permits member 250 to maintain a tight fit within the shaft structure 200 (FIG. 4).

In accordance with another aspect of the present invention, the dimensions of the insert member may be determined as a function of the dimensions of the shaft structure 200. To that end, the dimensions of the insert member 250, the first slot 252, the second slot 256, and the gap distance 264 can vary considerably with the various sizes of propshaft assemblies 20 available. As such, the dimensions need only be sized to maintain the resiliency of the insert member 250 during installation and while it is installed in the shaft structure 200. To that end, one such set of exemplary dimensions may be calculated by basing the first slot length 266, the second slot length 268, and the gap distance 264 on the length 260 of the insert member 250. More specifically, the first slot length 266 and the second slot length 268 are about five-eighths (⅝) of the length 260 of the insert member 250. Or put another way, the length 260 is about equal to 1.6 times the first slot length 266 and the second slot length 268. For example, if the length 260 of the insert member is about eight inches (about 203 mm), the first slot length 266 and the second slot length 268 would be about five inches (about 127 mm). It should be appreciated that adherence to the exact ratio is not necessary to maintain operability of the invention, but only implementation of the staggered slot configuration.

As mentioned above, the gap distance 264 may be based on the length 260 of the insert member 250. More specifically, the gap distance 264 may be sized to be about five percent (5%) of the length 260 of the insert member 250. Put another way, the length 260 of the insert member 250 is about equal to about twenty (20) times the gap distance 264. Using the example above, the insert member 250 that is about eight inches (about 203 mm) long would have about four-tenths of an inch (about 10 mm) gap distance. Accordingly, the first slot length 266 and the second slot length 268 would be about five inches (about 127 mm). As stated earlier, it should be appreciated that adherence to the exact ratio is not necessary to maintain operability of the invention, but only implementation of the staggered slot configuration.

The insert member 250 may be fabricated from various materials that are able to withstand the regime into which it will be installed. One such exemplary material is a high density cardboard. The insert member 250 may be purchased as a pre-fabricated cardboard tube or assembled from a cardboard ribbon and glued together. One such exemplary cardboard ribbon or pre-assembled cardboard tube may be purchased from Caraustar, Inc. (Saginaw, Mich. and other locations). One such exemplary cardboard ribbon may be about four inch (about 101 mm) wide paper ribbon, which may be fabricated into a suitable insert member. It should be appreciated, nevertheless, that the insert member 250 may be constructed of various materials; as such, the present invention need not be fabricated from cardboard to maintain operability.

The insert member 250 may be constructed by various methods. Production costs and ultimately unit cost may drive production method choices; however, a certain type of production is not needed to maintain operability of the present invention. One exemplary fabrication method may be milling the slots of insert or even hand-cutting the slots. Other such exemplary higher production methods may be a process by which a modified conventional die cuts the first slot 252 and the second slot 256. It should be appreciated that many processes exists to fabricate the present invention. It should be further appreciated that portions of the insert member 250 are depicted with square cut corners and the slots cut parallel to the centerline of the insert member. Accordingly, the insert member 250 may be constructed with round corners and the slots cut parallel to a radial line of the insert member. It should, therefore, be appreciated that many methods exists to fabricate the present invention and the depicted construction does not serve to limit the invention.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. It is, therefore, intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. A propshaft assembly operable to transmit torque between a first rotary member and second rotary member, the propshaft comprising:

a cylindrical tube having first and second ends;

a first cap coupled to said first end of said tube, said first cap being adapted to be drivingly coupled to the first rotary member; and a tubular insert member positioned within said tube between said first and second ends, said insert member having a first end, a second end and an outer cylindrical surface, said insert member being elastically deformable to define a reduced size to allow insertion of said insert member within said tube, said insert member including first and second slots radially extending therethrough, said first slot axially extending from said first end of said insert member, said second slot axially extending from said second end of said insert member.

2. The propshaft assembly of claim 1 wherein said insert member includes a wall having a substantially constant wall thickness.

3. The propshaft assembly of claim 2 wherein said first and second slots are circumferentially spaced apart and axially overlap.

4. The propshaft assembly of claim 3 wherein said insert member is operable to attenuate vibration produced during the transmission of torque between the first and second rotary members.

5. The propshaft assembly of claim 4 wherein said outer cylindrical surface of said insert member engages an inner surface of said tube.

6. A propshaft assembly operable to transmit torque between a first rotary member and second rotary member, the propshaft comprising:
- a cylindrical tube having first and second ends;
- a first cap coupled to said first end of said tube, said first cap being adapted to be drivingly coupled to the first rotary member;
- a second cap coupled to said second end of said tube, said second cap being adapted to be drivingly coupled to the second rotary member; and
- a tubular insert member positioned within said tube between said first and second ends, said insert member having a first end, a second end and an outer cylindrical surface, said outer cylindrical surface engaging an inner surface of said tube, said insert member including first and second slots radially extending therethrough, said first slot axially extending from said first end of said insert member a distance greater than half the length of said insert member, said second slot axially extending from said second end of said insert member a distance greater than half the length of said insert member.

7. The propshaft assembly of claim 6 wherein said first and second slots extend equal distances, each distance being about five-eighths of the length of the insert member.

8. The propshaft assembly of claim 7 wherein said tubular insert member includes a wall having a substantially constant thickness.

9. The propshaft assembly of claim 8 wherein said first cap includes two axially extending and circumferentially spaced apart projections, each projection including an aperture extending therethrough, said apertures being coaxially aligned with one another.

10. The propshaft assembly of claim 9 further including a universal joint adapted to interconnect said tube and the first rotary member.

11. The propshaft assembly of claim 9 wherein said insert member is operable to attenuate vibration produced during the transmission of torque between the first and second rotary members.

12. The propshaft assembly of claim 6 wherein said insert member is operable in a temporarily deformed state to define a substantially cylindrically shaped member having a first outer diameter and a relaxed state to define a second outer diameter, said second outer diameter being greater than said first outer diameter, whereby said insert member is operable for insertion within said tube when in said deformed state and operable to engage said tube when in said relaxed state.

* * * * *